United States Patent [19]

Roggero et al.

[11] Patent Number: 4,886,716
[45] Date of Patent: Dec. 12, 1989

[54] SOLID POLYMERIC ELECTROLYTE AND ELECTROCHEMICAL GENERATORS CONTAINING IT

[75] Inventors: Arnaldo Roggero, San Donato Milanese; Bruno Scrosati, Rome; Maria Andrei, Berceto; Stefano Passerini, Rome; Ugo Pedretti, Milan, all of Italy

[73] Assignee: Eniricerche S.p.A., Milan, Italy

[21] Appl. No.: 254,354

[22] Filed: Oct. 6, 1988

[30] Foreign Application Priority Data

Oct. 16, 1987 [IT] Italy ............................ 22305 A/87

[51] Int. Cl.$^4$ ............................................. H01M 6/18
[52] U.S. Cl. ................................................. 429/192
[58] Field of Search ............... 429/192, 191; 252/62.6; 204/421

[56] References Cited

U.S. PATENT DOCUMENTS

| | | | |
|---|---|---|---|
| 4,471,037 | 9/1984 | Bannister | 429/192 X |
| 4,556,614 | 12/1985 | Maute et al. | 429/192 X |
| 4,654,279 | 3/1987 | Bauer et al. | 429/192 |
| 4,720,910 | 1/1988 | Rourke et al. | 429/192 X |
| 4,758,483 | 7/1988 | Armand et al. | 429/192 |

Primary Examiner—Anthony Skapars
Attorney, Agent, or Firm—Hedman, Gibson, Costigan & Hoare

[57] ABSTRACT

A solid polymeric electrolyte is constituted by a solid solution of an ionic compound in a cross-linked polyether, wherein this latter is the copolymerization product of a vinyl-ether of formula:

$$R-(O-CH_2-CH_2)_n-O-CH=CH_2 \qquad (I)$$

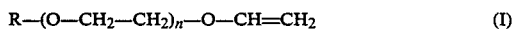

wherein:
R is the methyl or ehtyl radical; and
n is an integer comprised within the range of from 1 to 16; with a di-vinyl-ether of formula:

$$CH_2=CH-(O-CH_2-CH_2)_m-O-CH=CH_2 \qquad (II)$$

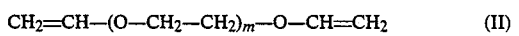

wherein:
m is an integer comprised within the range of from 1 to 16; with a molar ratio of the di-vinyl-ether (II) to the vinyl-ether (I) comprised within the range of from 1/100 to 10/100; with said polyether having a weight average molecular weight of about 10,000, and a glass transition temperature ($T_g$) comprised within the range of from —60° C. to —80° C.

Such a solid polymeric electrolyte is used in the manufacturing of high-energy-density electrochemical generators.

8 Claims, 2 Drawing Sheets

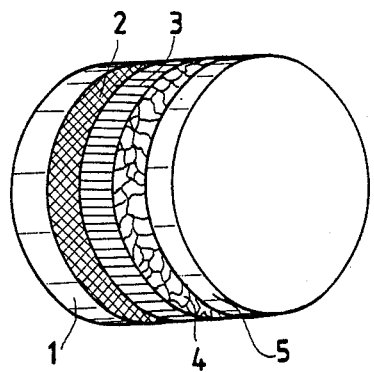
Fig.2
Fig.3
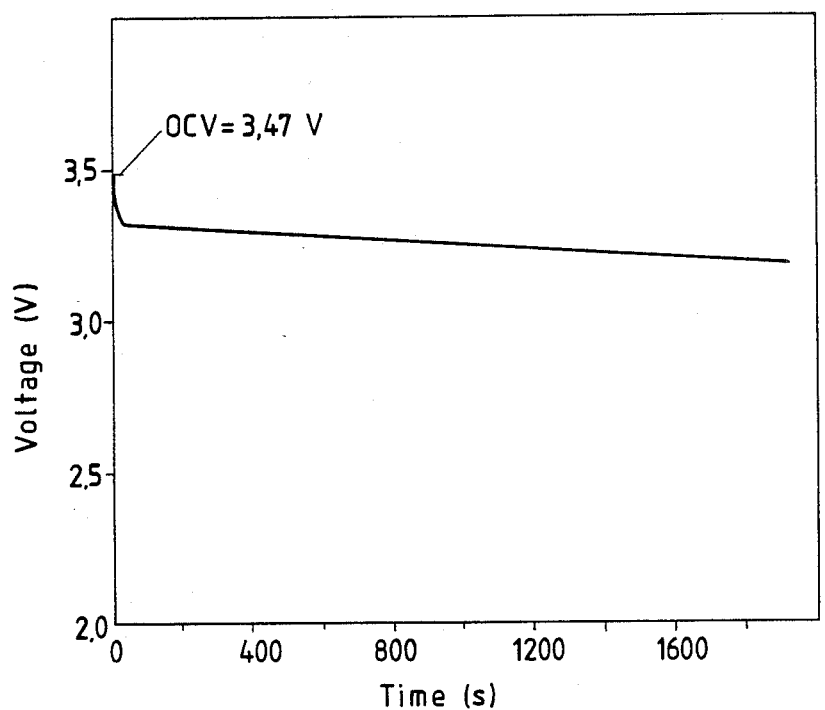

SOLID POLYMERIC ELECTROLYTE AND ELECTROCHEMICAL GENERATORS CONTAINING IT

The present invention relates to a solid polymeric electrolyte based on a cross-linked polyether and to the electrochemical generators which contain it. The invention relates also to such a cross-linked polyether, and to the process for preparing it.

In the art, solid polymeric electrolytes (also denominated as ionic conductive polymers) are known, which are constituted by a solid solution of an ionic compound totally dissolved in a solid macromolecular plastic material, wherein this latter is the polymerization product of monomers containing at least one eteroatom, in particular oxygen.

Said macromolecular material is usually polyethylene-oxide, or another polyether, such as disclosed, e.g., in U.S. Pat. No. 4,471,037; French patent 2,523,769; French patent 2,568,574 and European patent 13,199.

The use of these macromolecular materials, in the herein discussed technical sector, did not demonstrate to be fully satisfactory.

In general, polyethers pe se show a not very high mechanical strength. Therefore, in the manufacturing of the solid polymeric electrolytes, said polymers were sometimes blended with other materials, endowed with a higher mechanical strength, with the consequent complications.

Furthermore, a satisfactory ionic conductivity of the solid polymeric electrolytes based on polyethers of the prior art, is generally displayed within a range of rather high temperatures, therefore not very interesting for a practical use of the electrochemical generators.

The present Applicant has found now that the drawbacks affecting the prior art, which are hereinabove mentioned, can be overcome, or at least greatly reduced, by means of the adoption of a particular solid, cross-linked polyether as the macromolecular material for preparing the solid polymeric electrolyte.

In particular, such a cross-linked polyether is mechanically stronger, and more dimensionally stable than the polyethers customarily used for the intended purpose. Furthermore, such a cross-linked polyether can be easily transformed into a solid solution with an ionic compound, and the solid polymeric electrolyte so obtained has a high ionic conductivity, even at a relatively low temperature.

BRIEF DESCRIPTION OF THE DRAWINGS

FIG. 2 is a schematic showing of the device of the present invention;

FIG. 3 depicts discharge chart of the device of FIG. 2;

Figure 1:
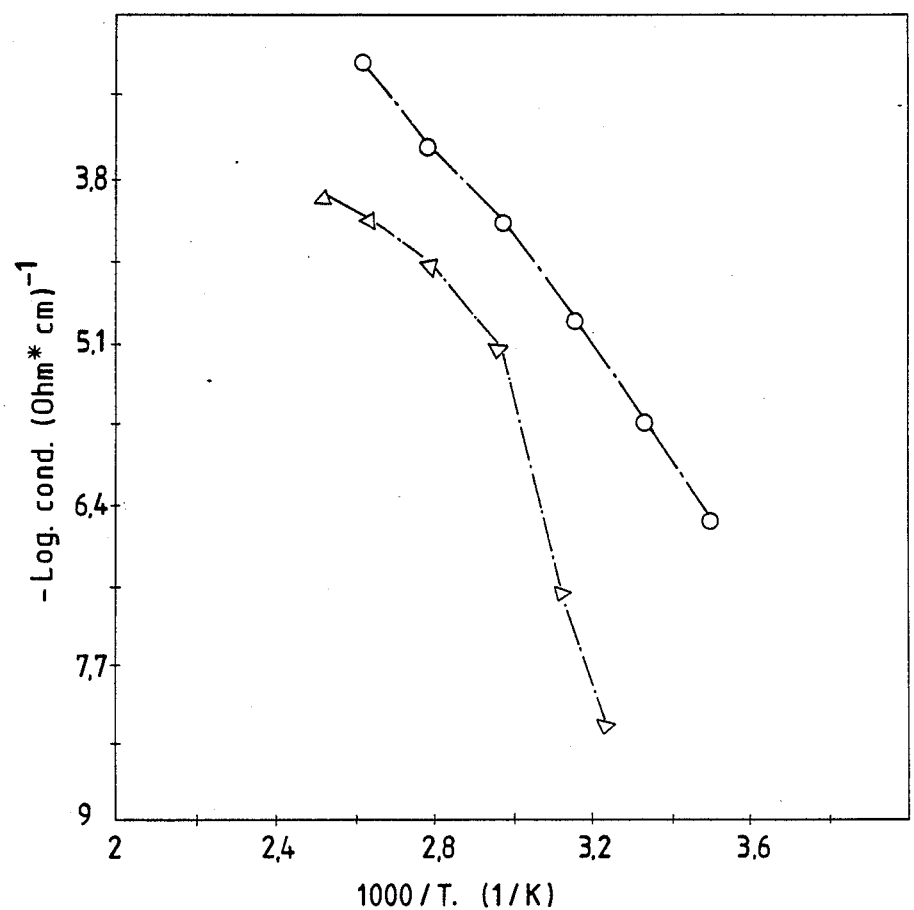
FIG. 1 depicts the conductivity of the membrane of the present invention.

In accordance therewith, according to a first aspect thereof, the present invention relates to a solid polymeric electrolyte, constituted by a solid solution of an ionic compound dissolved in a polyether, characterized in that said polyether is a solid and cross-linked polyether obtained by means of the copolymerization of a vinyl-ether of formula:

$$R-(O-CH_2-CH_2)_n-O-CH=CH_2 \quad (I)$$

wherein: R Is the methyl or ethyl radical; and n is an integer comprised within the range of from 1 to 16; with a di-vinyl-ether of formula:

$$CH_2=CH-(O-CH_2-CH_2)_m-O-CH=CH_2 \quad (II)$$

wherein:

m is an integer comprised within the range of from 1 to 16; with a molar ratio of the di-vinyl-ether (II) to the vinyl-ether (I) comprised within the range of from 1/100 to 10/100; with said cross-linked polyether having a weight average molecular weight of about 10,000, and a glass transition temperature ($T_g$) comprised within the range of from $-60°$ C. to $-80°$ C.

In the preferred form of practical embodiment, in the above formulae (I) and (II) R represents the methyl radical, n is an integer comprised within the range of from 1 to 6 and m is an integer comprised within the range of from 1 to 6.

Furthermore, in the copolymerization, molar ratios of di-vinyl-ether (II) to vinyl-ether (I) comprised within the ratio of from 1/100 to 3/100 are preferably used, and the cross-linked polyether has values of weight average molecular weight comprised within the range of from 20,000 to 100,000.

The vinyl-ether (I) can be prepared by reacting the ethyl-vinyl-ether:

$$CH_3-CH_2-O-CH=CH_2 \quad (III)$$

with a polyoxyethylene-glycol monoether representable by means of the formula:

$$RO-(CH_2-CH_2-O)_nH \quad (IV)$$

wherein R and n have the same meanings as previously reported as regards formula (I).

The reaction is advantageously carried out in the liquid phase, with an excess of compound (III) relatively to the compound (IV), preferably at the refluxing temperature under the room pressure, and in the presence of a transetherification catalyst.

Specific examples of catalysts suitable for the intended purpose are mercury-(II) compounds, such as mercury-(II) acetate and mercury-(II) sulphate.

The vinyl-ether (I) is recovered from the products of reaction by means of the normal separation techniques.

The di-vinyl-ether (II) can be prepared by reacting the vinyl-ether (III) and a poly-oxy-ethylene-glycol of formula:

$$HO-(CH_2-CH_2O)_m-H \quad (IV)$$

wherein m has the same meaning as previously stated with regard to formula (II); by operating under conditions at all similar to those as above reported for the preparation of the vinyl-ether (I).

The cross-linked polyether according to the present invention is obtained by means of the copolymerization of the vinyl-ether (I) with the di-vinyl-ether (II), in the above stated molar ratios. The reaction of copolymerization is advantageously carried out in solution in an inert solvent, at a temperature of the order of $-75°/-80°$ C., and in the presence of a Friedel-Crafts catalyst, used in an amount of from 0.8 to 1.0 mol per each 100 mol of the vinyl-ether (I) and di-vinyl-ether (II) submitted to the polymerization.

Examples of catalysts suitable for the intended purpose are: etherated boron trifluoride, aluminum trichloride, aluminum-alkyl halides (such as diethyl-aluminum chloride and ethyl-aluminum dichloride) and tin tetrachloride.

Examples of solvents suitable for the intended purpose are: hydrocarbons, such as heptane, benzene and toluene and chlorinated hydrocarbons, such as dichloromethane.

Under the above set out conditions, the polymerization times are of the order of from 30 to 60 minutes.

At the end of the polymerization, the catalyst is deactivated, e.g., by means of the addition of an aliphatic alcohol, such as methanol, and the cross-linked polyether is then recovered from the polymerization medium by means of the normal techniques of separation of a polymer from a solution in an organic solvent.

The so-obtained cross-linked polyether can be submitted to a characterization by means of NMR and IR spectroscopy.

Its glass transition temperature, as determined by DSC, is comprised within the range of from $-60°$ C. (for the copolymers with a higher content of di-vinyl-ether (II)) to $-80°$ C. (for the copolymers with a lower content of said di-vinyl-ether (II)).

The molecular weight of the cross-linked polyether can be determined by osmometry and by means of gel-permeation chromatography. The molecular weight value is influenced by the conditions under which the polymerization is carried out, and, in particular, by the polymerization temperature, the contentration of the catalyst, and by the ratio of the di-vinyl-ether (II) to the vinyl-ether (I). In any case, by operating under the above disclosed temperatures, the weight average molecular weight of the cross-linked polyether is generally higher than 10,000 and is normally comprised within a range of values of from 30,000 to 100,000.

The solid polymeric electrolyte, according to the present invention, is constituted by a solid solution of an ionic compound in the solid cross-linked polyether.

Ionic compounds suitable for the intended purpose are salts, and, in particular, perchlorates, borates, fluoborates, thiocyanates, trifluoroacetates and trifluoromethane-sulphonates of (univalent or polyvalent) metals, and, in particular, lithium, sodium, potassium, calcium, copper, zinc, magnesium, lead, tin and aluminum, used in such an amount as to have an atomic ratio of the polyether oxygen to the metal comprised within the range of from about 4/1 to about 12/1.

Preferred for such purpose are the lithium salts, and, in particular, lithium perchlorate, and in this case the solid polymeric electrolyte can contain the ionic compound in an amount comprised within the range of from 10 to 30% by weight, and preferably in amounts of the order of 20% by weight.

In the preparation of the polymeric solid electrolyte, the process can be carried out by independently dissolving, in a suitable organic solvent (e.g., acetonitrile), the cross-linked polyether and the ionic compound, in order to form two solutions. The two solutions are then mixed with each other in order to obtain a homogeneous solution, which is deposited on a suitable support (e.g., a polytetrafluoroethylene disk) in the form of a liquid film, from which the solvent is slowly evaporated. At the end of the evaporation, suitably carried out under an argon atmosphere, a solid polymeric electrolyte is obtained in the form of a membrane having a thickness of the order of from 50 to 200 microns.

Such a polymeric electrolyte is mechanically strong, is dimensionally stable and has a high conductivity, also at relatively low temperatures, with the conductivity thereof being of ionic type in the absence, or in the substantial absence, of a conductivity of electronic type. The solid polymeric electrolyte can be thus used as an electrolytic separator in electrochemical generators, in optical and electrochromic displays and in sensors.

The following experimental examples are illustrative and non-limitative of the purview of the present invention.

EXAMPLE 1

Preparation of the vinyl-ether:

To a three-neck flask of 500 ml of capacity, equipped with refluxing condenser and maintained under a nitrogen stream, ethyl-vinyl-ether (1.8 mol), diethyleneglycol-monomethyl-ether (0.6 mol), and mercuric acetate ($5.7 \cdot 10^{-3}$ mol) are charged. The reaction mixture is heated to the refluxing temperature and is maintained under refluxing conditions for 10 hours. During this time, the temperature increases from the initial value of 39° C. to the end value of 42° C.

The reaction is then quenched by means of the addition of solid sodium carbonate and the reaction mixture is submitted to distillation, firstly under the atmospheric pressure, in order to remove the excess of ethyl-vinyl-ether and the reaction byproduct ethyl ether, and then under reduced pressure (20 torr) in order to separate the vinyl ether of the title from unaltered diethylene-glycol monomethyl-ether.

The so produced vinyl ether of the title has a purity higher than 99% and the yield thereof, relatively to the diethylene-glycol monomethyl-ether used as the starting material, is of about 80%. Its structure is confirmed by NMR spectroscopy, IR spectroscopy and mass spectrometry.

EXAMPLE 2

Preparation of the di-vinyl-ether:

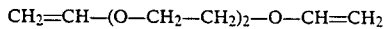

The compound of the title is obtained by operating as disclosed in Example 1, by using 0.6 mol of diethylene glycol in lieu of diethylene-glycol monomethyl-ether.

Such a di-vinyl-ether has a purity higher than 95%, is obtained with a yield of the order of 60% relatively to diethylene glycol, and its structure is confirmed by NMR and IR spectroscopy, and mass spectroscopy.

EXAMPLE 3

Preparation of the cross-linked polyether

To a glass reactor of 100 ml of capacity, equipped with a gas-tight spiral stirrer and ways for introducing the reactants and the inert gas, and maintained at $-80°$ C., 2,190 mg (15 mmol) of the vinyl-ether prepared in Example 1 and 71 mg (0.45 mmol) of the di-vinyl-ether prepared in Example 2 are charged together with 10 ml of dichloromethane solvent.

To the so-obtained mixture, the catalyst of etherated boron trifluoride (BF$_3$.Et$_2$O) (0.15 mol), diluted in the same polymerization solvent, is slowly added (over a time of about 10 minutes) with strong stirring.

As the polymerization proceeds, a strong increase is observed in the viscosity of the system. One hour later, a few drops of methanol is added in order to deactivate the catalyst, and the polymer is recovered by extraction with an organic solvent.

The so-separated cross-linked polyethylene (about 1,600 mg) is a white solid and is submitted to characterization by NMR and IR spectroscopy.

The glass transition temperature of the cross-linked polyether, determined by DSC, is of −70° C. The weight average molecular weight of the cross-linked polyether, as determined by osmometry and gel-permeation chromatography is of about 30,000.

EXAMPLE 4

Preparation of the solid polymeric electrolyte

A first solution in prepared by dissolving, at the temperature of 25° C., 160 mg of the cross-linked polyether prepared in Example 3, in 10 ml of acetonitrile.

A second solution is prepared by dissolving, at the temperature of 25° C., 44 mg of lithium perchlorate (LiClO$_4$) in 10 ml of acetonitrile.

The two solutions are mixed and homogenized, by operating at the temperature of 25° C., and the resulting solution is spread on teflon disks, as a film of about 4 mm of thickness.

The solvent is slowly evaporated, over a time of 4–5 hours, by operating under reduced pressure in an oven, drying the film under an argon atmosphere, and the solid polymeric electrolyte is obtained as a solid and transparent membrane, having a thickness of the order of 100–200 microns.

The measurement of the conductivity of the membrane is carried out in a cell equipped with two symmetrical electrodes of platinum, between which the same membrane is housed.

The results of this determination are reported in the chart of FIG. 1 (" " line).

In this chart, on the ordinate the values of conductivity as (ohms.cm)$^{-1}$, and on the abscissa the values of temperature as degrees Kelvin are reported.

On the same chart (" " line) the values of conductivity of a membrane of the prior art are reported. Said membrane is obtained according to the same route as herein disclosed, but replacing the cross-linked polyethylene of Example 3, by an ethylene oxide polymer having a weight average molecular weight of 5,000,000, and a glass transition temperature (T$_g$) of −60° C.

EXAMPLE 5

Preparation of an electrochemical generator

The electrochemical device schematically shown in FIG. 2 of the drawing tables is assembled, wherein by the reference numerals (1) and (5) the stainless steel current-bearing elements, by (2) the negative lithium electrode, by (3) the polymeric electrolyte prepared in Example (4) and by (4) a cathodic mixture formed by LiV$_3$O$_8$(40% by weight), polyethylene-oxide (40% by weight) and acetilene black (20% by weight); are indicated.

Such a device displays and e.m.f. of about 3 V at the operating temperature of the polymeric electrolyte.

On the electrochemical generator, tests of discharge at 0.1 mA/cm$^2$ (t=80° C.) are carried out, and the discharge chart is reported in FIG. 3 of the drawing tables.

We claim:

1. Solid polymeric electrolyte, constituted by a solid solution of an ionic compound dissolved in a polyether, characterized in that said polyether is a solid and cross-linked polyether obtained by means of the copolymerization of a vinyl-ether of formula:

R—(O—CH$_2$—CH$_2$)$_n$—O—CH=CH$_2$     (I)

wherein:
R is the methyl or ethyl radical; and
n is an integer comprised within the range of from 1 to 16; with a di-vinyl-ether of formula:

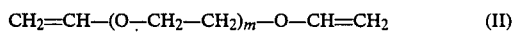

CH$_2$=CH—(O—CH$_2$—CH$_2$)$_m$—O—CH=CH$_2$     (II)

wherein:
m is an integer comprised within the range of from 1 to 16; with a molar ratio of the di-vinyl-ether (II) to the vinyl-ether (I) comprised within the range of from 1/100 to 10/100; with said polyether having a weight average molecular weight of about 10,000, and a glass transition temperature (T$_g$) comprised within the range of from −60° C. to −80° C.

2. Solid polymeric electrolyte according to claim 1, characterized in that in the above formulae (I) and (II) R represents the methyl radical, m is an integer comprised within the range of from 1 to 6, and n is an integer comprised within the range of from 1 to 6.

3. Solid polymeric electrolyte according to claim 1, characterized in that in the copolymerization, molar ratios of the di-vinyl-ether (II) to the vinyl-ether (I) comprised within the ratio of from 1/100 to 3/100 are preferably used, and the cross-linked polyether has values of weight average molecular weight comprised within the range of from 20,000 to 100,000.

4. Solid polymeric electrolyte according to claim 1, characterized in that it contains an ionic compound selected from perchlorates, borates, fluoborates, thiocyanates, trifluoroacetates and trifluoromethanesulphonates of metals lithium, sodium, potassium, calcium, copper, zinc, magnesium, lead, tin and aluminum, in such an amount as to have an atomic ratio of the polyether oxygen to the metal comprised within the range of from about 4/1 to about 12/1.

5. Solid polymeric electrolyte according to claim 4, characterized in that said ionic compound is a lithium compound.

6. Solid polymeric electrolyte according to claim 5, characterized in that said lithium compound is lithium perchlorate.

7. Solid polymeric electrolyte according to claim 1, characterized in that it is in the form of a membrane having a thickness comprised within the range of from 50 to 200 microns.

8. An electrolytic generator, incorporating the solid electrolytic polymer of claims 1, 2, 3, 4, 5, 6, or 7.

* * * * *